United States Patent
Widdle, Jr. et al.

(10) Patent No.: US 8,434,293 B2
(45) Date of Patent: May 7, 2013

(54) HIGH STIFFNESS SHAPE MEMORY ALLOY ACTUATED AEROSTRUCTURE

(75) Inventors: Richard D. Widdle, Jr., Carnation, WA (US); Matthew T. Grimshaw, Seattle, WA (US); Kava S. Crosson-Elturan, Bloomington, IN (US); James H. Mabe, Seattle, WA (US); Frederick T. Calkins, Renton, WA (US); Lynn M. Gravatt, Seattle, WA (US); Moushumi Shome, Kent, WA (US)

(73) Assignee: The Boeing Company, Chicago, IL (US)

( * ) Notice: Subject to any disclaimer, the term of this patent is extended or adjusted under 35 U.S.C. 154(b) by 861 days.

(21) Appl. No.: 12/537,002

(22) Filed: Aug. 6, 2009

(65) Prior Publication Data

US 2011/0030380 A1 Feb. 10, 2011

(51) Int. Cl.
*F02K 1/40* (2006.01)
*F02K 3/04* (2006.01)

(52) U.S. Cl.
USPC .......................... 60/264; 60/771; 239/265.19

(58) Field of Classification Search .................. 60/226.1, 60/262, 264, 771; 239/265.19
See application file for complete search history.

(56) References Cited

U.S. PATENT DOCUMENTS

| | | | |
|---|---|---|---|
| 3,568,792 A * | 3/1971 | Urquhart .................. | 239/265.19 |
| 5,275,358 A | 1/1994 | Goldhammer et al. | |
| 5,558,304 A * | 9/1996 | Adams ...................... | 244/134 A |
| 5,662,294 A | 9/1997 | Maclean et al. | |
| 5,988,563 A | 11/1999 | Allen | |
| 6,065,934 A | 5/2000 | Jacot et al. | |
| 6,182,929 B1 * | 2/2001 | Martin et al. ................. | 244/219 |
| 6,345,790 B1 | 2/2002 | Brix | |
| 6,394,397 B1 | 5/2002 | Ngo et al. | |
| 6,427,948 B1 | 8/2002 | Campbell | |
| 6,718,752 B2 | 4/2004 | Nesbitt et al. | |
| 6,735,936 B2 | 5/2004 | Rey et al. | |
| 6,827,314 B2 | 12/2004 | Barriety | |
| 7,288,326 B2 * | 10/2007 | Elzey et al. ................... | 428/593 |

(Continued)

FOREIGN PATENT DOCUMENTS

| DE | 10313290 A1 | 10/2004 |
|---|---|---|
| EP | 1531126 A1 | 5/2005 |

(Continued)

OTHER PUBLICATIONS

Leester-Schadel, M., et al., "Micro Actuators on the Basis of Thin SMA Foils," Feb. 2008, Microsyst. Technol., 14: pp. 697-704.*

(Continued)

*Primary Examiner* — Ted Kim
(74) *Attorney, Agent, or Firm* — Ameh IP; Elahe Toosi; Lowell Campbell

(57) ABSTRACT

A shape memory alloy (SMA) actuated aerostructure operable to dynamically change shape according to flight conditions is disclosed. Deformable structures are actuated by SMA actuators that are coupled to face sheets of the deformable structures. Actuating the SMA actuators produces complex shape changes of the deformable structures by activating shape changes of the SMA actuators. The SMA actuators are actuated via an active or passive temperature change based on operating conditions. The SMA actuated aerostructure can be used for morphable nozzles such as a variable area fan nozzle and/or a variable geometry chevron of a jet engine to reduce engine noise during takeoff without degrading fuel burn during cruise.

19 Claims, 9 Drawing Sheets

U.S. PATENT DOCUMENTS

| | | | |
|---|---|---|---|
| 2003/0221411 A1* | 12/2003 | Nesbitt et al. | 60/262 |
| 2004/0000619 A1 | 1/2004 | Barriety | |
| 2004/0155157 A1 | 8/2004 | Bray | |
| 2004/0197519 A1* | 10/2004 | Elzey et al. | 428/68 |
| 2005/0229585 A1 | 10/2005 | Webster | |
| 2006/0101803 A1 | 5/2006 | White | |
| 2007/0114327 A1 | 5/2007 | Dees et al. | |
| 2008/0272232 A1 | 11/2008 | Cagle et al. | |
| 2008/0272615 A1 | 11/2008 | Mcknight et al. | |
| 2008/0308683 A1 | 12/2008 | Sankrithi et al. | |
| 2010/0170261 A1* | 7/2010 | Stieger et al. | 60/771 |

FOREIGN PATENT DOCUMENTS

| | | |
|---|---|---|
| GB | 2282996 A | 4/1995 |
| GB | EP 1878877 A2 | 1/2008 |
| WO | WO03000547 A1 | 1/2003 |
| WO | WO 2006055217 A1 | 5/2006 |
| WO | WO2007031732 A1 | 3/2007 |

OTHER PUBLICATIONS

PCT Intl Search Report and Written Opinion for Application No. PCT/US2008/064719, dated Apr. 6, 2009, 14 pgs.

International Search Report and Written Opinion of the International Searching Authority mailed on Jun. 1, 2011 for PCT Application No. PCT/US2010/042331 filed on Jul. 16, 2010—International Searching Authority—European Patent Office.

* cited by examiner

HIGH STIFFNESS SHAPE MEMORY ALLOY ACTUATED AEROSTRUCTURE

FIELD

Embodiments of the present disclosure relate generally to shape memory alloy structures. More particularly, embodiments of the present disclosure relate to shape memory alloy structures operable to affect fluid flow.

BACKGROUND

An airplane's airframe and engines may produce varying amounts of audible noise and turbulent drag during different flight conditions. One of the main sources of noise and drag is the air flow around aerostructure surfaces. Leading and trailing wing surfaces, control surfaces, landing gear structures, air flow around turbofan engine surfaces, and turbofan engine exhaust flow may produce noise. As flight conditions change, the velocity, temperature, pressure, turbulence, and other properties of the air and exhaust can change considerably. On takeoff and landing, the external air (free stream air) velocity may be lower, temperatures higher, and engine exhaust power at a maximum (i.e., for takeoff). During cruise, the external air (free stream air) velocity may be higher, temperatures lower, and turbofan engine exhaust power at a cruise level. From ground to cruising altitude, all of these factors may vary in complex non-linear ways for various flight conditions.

In order to improve aircraft performance across all phases of flight such as by reducing takeoff noise and reducing drag during cruise while minimizing weight, an aircraft design should include optimized shapes and physical properties (such as stiffness) of the aerostructures. However, the optimal shape and other properties change depending on the flight conditions. Thus, it may be desirable for an aerostructure to be dynamically reconfigurable in order to change to adapt to the current flight conditions.

Of particular interest is the noise and drag from the engines. Conventional turbofan engines include a fan section and an engine core, with the fan section having a larger outer diameter than that of the engine core. The fan section and the engine core are disposed sequentially about a longitudinal axis and are enclosed in a nacelle. An annular path of primary airflow (core flow) passes through the fan section and the engine core (core nozzle) to generate primary thrust. An annular path of fan flow, disposed radially outward of the core airflow path, passes through the fan section and exits through a nozzle (fan nozzle) to generate fan thrust.

The requirements for takeoff and landing conditions are different from requirements for a cruise condition. For cruise conditions, it is desirable to have a smaller diameter fan nozzle for increasing cruise performance and for maximizing fuel efficiency, whereas, for takeoff and landing conditions, smaller diameter fan nozzles may not be considered optimum. Therefore, in many conventional engines, cruise performance and fuel efficiency are often compromised to ensure safety of the turbofan engine at take-off and landing. In addition to improved efficiency, varying the fan nozzle area and hence the engine bypass ratio is an extremely effective means of reducing community noise during takeoff and approach. Some turbofan engines have implemented variable area fan nozzles (VAFN). VAFN have the ability to have a smaller fan nozzle diameter during cruise conditions and a larger fan nozzle diameter during take-off and landing conditions.

With present day jet aircraft, structures typically known in the industry as "chevrons" have been used to help in suppressing noise generated by a jet engine. Chevrons have traditionally been, triangular, tab-like elements located along a trailing edge of fan and core nozzles of turbofan jet engines such that they project into the exhaust gas flow stream exiting from the fan and core nozzles. For a wide range of operating conditions, chevrons have proven to be effective in reducing broadband noise generated by the mixing of airflows from the core nozzle and fan nozzle, and the mixing of airflows from the fan nozzle and free stream air. Since the chevrons can interact directly with the fan flow, however, they also generate drag and loss of thrust. Consequently, there is a tradeoff between the need to attenuate noise, and minimizing the loss of thrust due to the presence of the chevrons.

Thus, there is a need for technology which provides the needed noise attenuation but does not produce additional drag or loss of thrust during cruise conditions.

SUMMARY

A shape memory alloy (SMA) actuated aerostructure operable to dynamically change shape according to flight conditions is disclosed. Deformable structures are actuated by SMA actuators that are coupled to face sheets of the deformable structures. Actuating the SMA actuators produces complex shape changes of the deformable structures by activating shape changes of the SMA actuators. The SMA actuators are actuated via an active or passive temperature change based on operating conditions. The SMA actuated aerostructure can be used for morphable nozzles such as a variable area fan nozzle and/or a variable geometry chevron of a jet engine to reduce engine noise during takeoff without degrading fuel burn during cruise.

A first embodiment comprises a shape memory alloy actuated aerostructure. The shape memory alloy actuated aerostructure comprises a first face sheet and a second face sheet. The shape memory alloy actuated aerostructure further comprises at least one shape memory alloy actuator coupled to the first face sheet at at least one location on the first face sheet and coupled to the second face sheet at a plurality of locations on the second face sheet.

A second embodiment comprises a system for shaping a shape memory alloy actuated aerostructure in response to temperature changes. The system comprises at least one shape memory alloy actuated aerostructure which comprises a first face sheet, a second face sheet, and at least one shape memory alloy actuator located between the first face sheet and the second face sheet. The shape memory alloy actuator is coupled to the first face sheet at at least one location on the first face sheet and coupled to the second face sheet at a plurality of locations on the second face sheet. The system further comprises a controller operable to activate at least one region of the at least one shape memory alloy actuator to morph the at least one shape memory alloy actuated aerostructure.

A third embodiment comprises a method for operating a shape memory alloy actuated aerostructure. The method comprises determining at least one characteristic of the shape memory alloy actuated aerostructure to be optimized, and controlling a temperature of at least one portion of at least one shape memory alloy actuator to optimize the at least one characteristic. The shape memory alloy actuator is located between a first face sheet and a second face sheet of the shape memory alloy actuated aerostructure, and is coupled to the first face sheet at at least one location on the first face sheet and coupled to the second face sheet at two or more locations on the second face sheet.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is merely illustrative in nature and is not intended to limit the embodiments of the disclosure nor the application and uses of such embodiments. Furthermore, there is no intention to be bound by any expressed or implied theory presented in the preceding technical field, background, brief summary or the following detailed description.

Embodiments of the disclosure are described herein in the context of practical non-limiting applications, namely, morphable fan nozzles comprising variable fan nozzle panels and/or variable geometry chevrons. Embodiments of the disclosure, however, are not limited to such morphing fan nozzles applications, and the techniques described herein may also be utilized in other morphing applications. For example, embodiments may be applicable to fluid dynamic surfaces, other aircraft structures, automotive structures, robotics, other morphable structures comprising suitable geometries to alter a fluid flow, and the like.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to signal processing, aircraft control systems, high lift devices, and other functional aspects of the systems (and the individual operating components of the systems) may not be described in detail herein. In addition, those skilled in the art will appreciate that embodiments of the present disclosure may be practiced in conjunction with a variety of different aircraft control systems and aircraft wing configurations and engines, and that the system described herein is merely one example embodiment of the disclosure.

Figure 1:
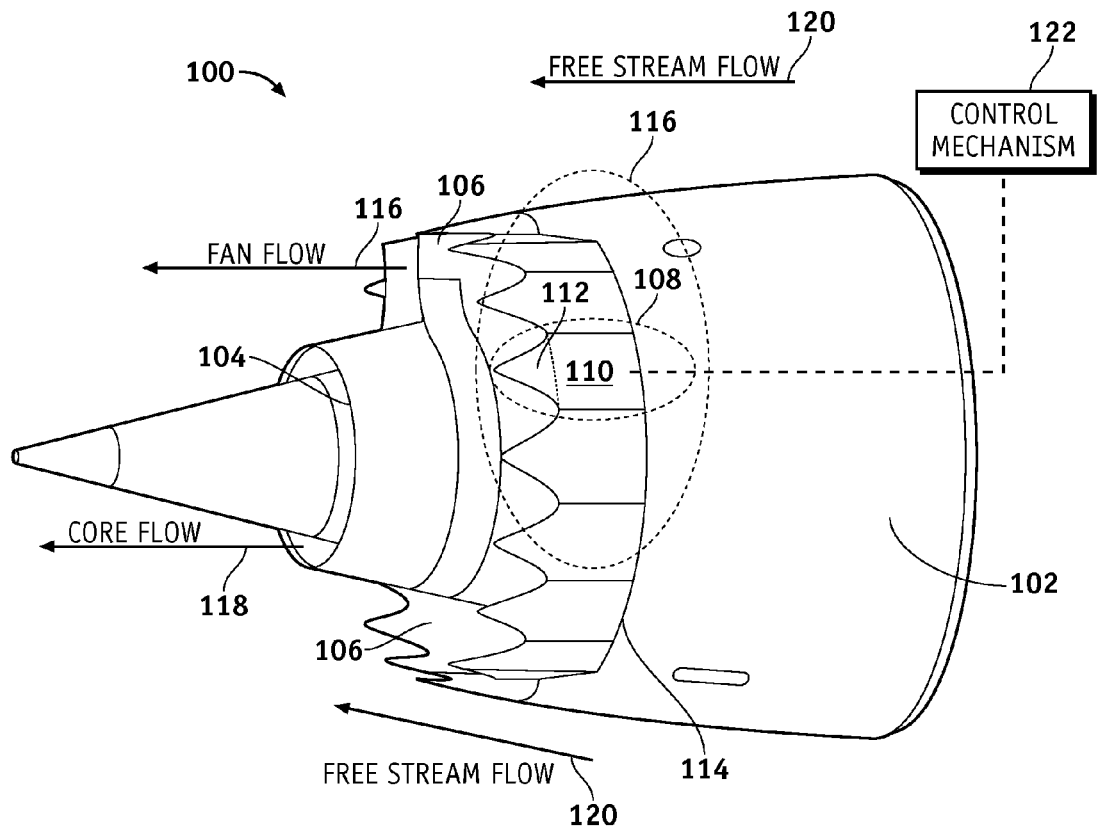
FIG. 1 illustrates a simplified side view of an aircraft turbofan engine nacelle showing a morphable fan nozzle comprising a plurality of deformable structures according to an embodiment of the disclosure.

FIG. 1 illustrates a simplified side view of an aircraft turbofan engine nacelle 100 (nacelle 100) showing a morphable fan nozzle comprising a plurality of deformable structures according to an embodiment of the disclosure. The nacelle 100 is a housing separate from the fuselage (not shown) that holds a jet engine (not shown) for an aircraft. The nacelle 100 may comprise an engine inlet (not shown), a fan cowl 102, thrust reverser (not shown), a core flow nozzle 104, a morphable fan nozzle 106, and a control mechanism 122.

The core flow nozzle 104 provides a controlled vent for hot turbine engine exhaust. A turbofan engine provides thrust (i.e., a gas flow) from both the core flow 118 (gas flow) of the hot turbine engine exhaust from the core flow nozzle 104, and the fan flow 116 (gas flow) from the turbofan powered by the turbine engine. In order to reduce noise, the core flow nozzle 104 may have chevrons (not shown). The core flow 118 generally has a higher velocity than the fan flow 116.

The morphable fan nozzle 106 may comprise a plurality of deformable structures 108 configured to alter a flow. In the embodiment shown in FIG. 1, each of the deformable structures 108 comprises a VAFN panel 110 coupled to a variable geometry chevron (VGC) 112. The deformable structures 108 may extend from a lip area 114 of the morphable fan nozzle 106. The deformable structures 108 may be arranged circumferentially around the entire lip area 114 of the morphable fan nozzle 106. However, the deformable structures 108 may be located at any location, suitable to alter a flow. Each of the deformable structures 108 of the morphable fan nozzle 106 is not limited to the VAFN panel 110 and/or the VGC 112 of this embodiment and other structures may also be used. The deformable structures 108 may comprise structures that are, without limitation, triangular, chambered, rectangular, circular, or a combination thereof, and the like.

As will be described in greater detail below, according to various embodiments of the disclosure, each of the deformable structures 108 comprises one or more shape memory alloy (SMA) actuators operable to deform (i.e., bend, deflect, change shape) each of the deformable structures 108 in response to heating and/or cooling. In this manner, each of the deformable structures 108 can change shape in one or more dimensions to alter the flow. For example, each of the deformable structures 108 can change shape to reduce the noise produced by operation of the turbofan engine of an aircraft as explained in more detail below in the context of discussion of FIGS. 2-3.

The control mechanism 122 is configured to thermally control extension of each of the deformable structures 108 into the flow path of the fan flow 116 for a first set of flight conditions (e.g., take off, landing and approach) to reduce the airflow noise. The control mechanism 122 also thermally controls extension of each of the deformable structures 108 away from the flow path of the exhaust flow for a second set of flight conditions (e.g., cruise) to maximize fuel efficiency. In one embodiment, the control mechanism may comprise a passive control mechanism to control the deformation of each of the deformable structures 108 based on an ambient temperature corresponding to an altitude at a flight condition. In another embodiment, the control mechanism 122 may include or be realized as a controller (connected to the aircraft systems), as explained below in the context of FIG. 5 to facilitate controlling the deformation (i.e., changing the shape) of each of the deformable structures 108.

Figure 2:
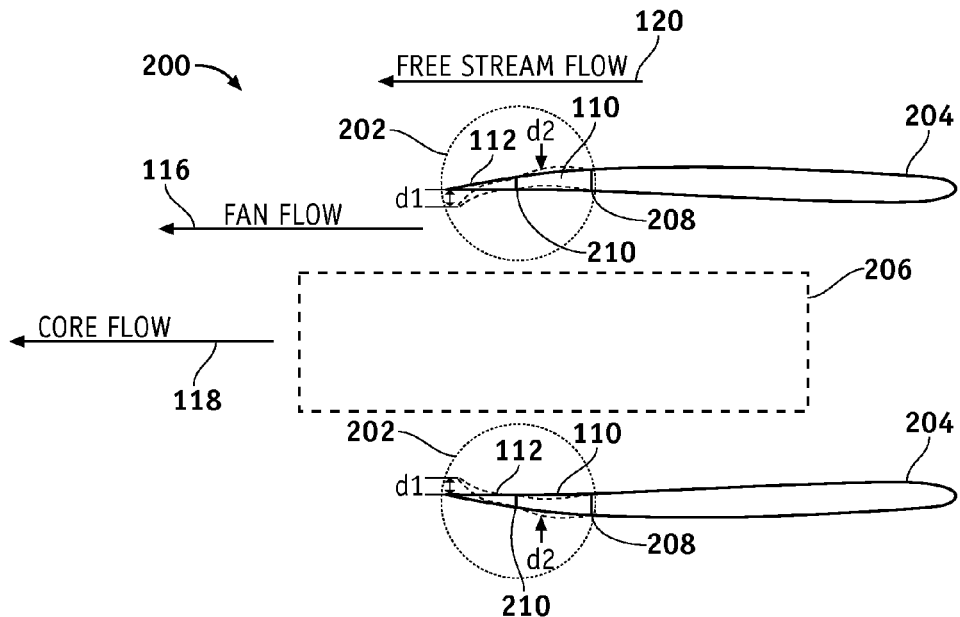
FIG. 2 illustrates a simplified schematic cross sectional view of the turbofan engine nacelle of FIG. 1 showing two of the deformable structures of the morphable fan nozzle according to an embodiment of the disclosure.

FIG. 2 illustrates a simplified schematic cross sectional view of the turbofan engine nacelle showing two of the deformable structures 202 of the morphable fan nozzle 200 according to an embodiment of the disclosure. The embodiment shown in FIG. 2 comprises a fan cowl 204 (102 in FIG. 1) which includes a plurality of deformable structures 202 (108 in FIG. 1), and a turbofan engine 206. The deformable structures 202 may comprise a VAFN panel 110 extending from the trailing edge lip area 208 of the morphable fan nozzle 200 and coupled to a VGC 112 at a VGC attachment location 210. In one embodiment, the VGC 112 may be deployed by an amount d1 into the fan flow 116 when actuated by an SMA actuator as explained in more detail below. d1 may be, for example but without limitation, about 1.5 inches. Additionally, the VAFN panel 110 may extend by an amount d2 when actuated by the SMA actuator as explained in greater detail below. In one embodiment, d2 may be, for example but without limitation, about 1.5 inches, which results in an about 20 percent increase in area of the morphable fan nozzle 200 (morphable fan nozzle 106 in FIG. 1). In this manner, the deformable structures 202 (108 in FIG. 1) changes a shape of the morphable fan nozzle 106/200 from a non-actuated profile or a nominal profile to an actuated profile that can suitably alter characteristics of the fan flow 116 based on various flight conditions as explained in more detail below.

Figure 3:
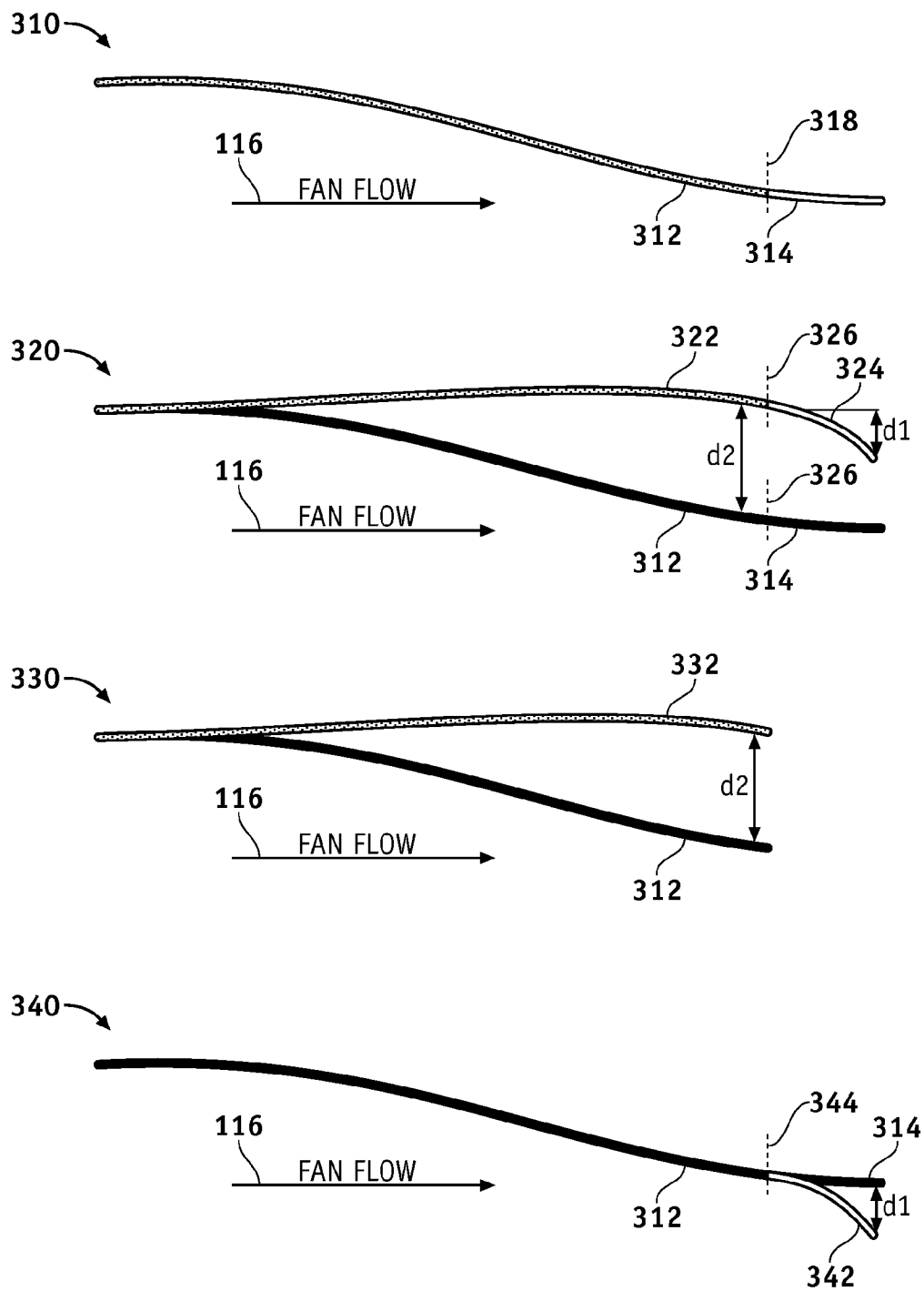
FIG. 3 illustrates various schematic profiles that each of the deformable structures of FIG. 1 can be morphed into according to various embodiments of the disclosure.

FIG. 3 illustrates schematic profiles that each of the deformable structures (i.e., VAFN panel plus VGC, VCG only, VAFN panel only) of the morphable fan nozzle 106/200 of the FIG. 1 and FIG. 2 can be morphed into according to various embodiments of the disclosure. FIG. 3 shows a nominal profile 310, and a plurality of actuated profiles 320, 330, and 340 of the deformable structures 202/108. The nominal profile 310 shows a nominal VAFN panel profile 312 for a non-actuated VAFN panel 110 that may be coupled to a VGC 112 at an attachment point 318, and a nominal VGC profile 314 for a non-actuated VGC 112. The nominal (non-actuated) profiles 312 and 314 are compared to their respective actuated profiles 320, 330, and 340 below.

The actuated profile 320 shows an exemplary actuated state of the deformable structures 202 comprising the VAFN panel 110 coupled to the VGC 112 (FIG. 2) at the attachment point 326 (VGC attachment location 210 in FIG. 2). The actuated profile 320 comprises an actuated VAFN panel profile 322, and an actuated VGC profile 324. As shown by the actuated VAFN panel profile 322, if the VAFN panel 110 is actuated by an SMA actuator, the VAFN panel 110 is deflected/deployed outward into the free stream flow 120 (FIG. 2) and away from the fan flow 116 by an amount d2 as compared to the nominal VAFN panel profile 312. Also, as shown by the actuated VGC profile 324, if the VGC 112 is actuated by an SMA actuator, the VGC 112 deploys into the fan flow 116 by an amount d1 compared the nominal VGC profile 314. In this manner, according to this embodiment (deformable structures each comprising a VAFN panel and a VGC) the deformable structures 202 reduce the noise caused by the turbofan engine (FIG. 1) via two different mechanisms. In the first mechanism, the VAFN panel 110 is deflected/deployed outward into the free stream flow 120 (pulled back out of the fan flow 116) to increase area (i.e., by about 10%) of the morphable fan nozzle 106 based on the amount d2. The increase in the area of the morphable fan nozzle 106 causes a decrease in velocity of the fan flow 116 that is moving through the morphable fan nozzle 106, thereby making the engine quieter. The second mechanism involves introducing vortices (turbulence) into the fan flow 116 by deploying the VCG 112 (i.e., triangular chevron) into the fan flow 116. In this manner, the VGC 112 may deform such that it extends (i.e., "deploys") partially by an amount d1 into a path of the fan flow 116 exiting from the morphable fan nozzle 106 to promote mixing of the fan flow 116 in proximity or adjacent to free stream flow 120 and thereby reducing noise. During cruise and other flight conditions, each of the deformable structures 108/202 may return to the nominal profile 310, or other shapes.

The actuated profile 330 shows an exemplary actuated state of each of the deformable structures 202 comprising the VAFN panel 110 (i.e., without the VGC 112). The actuated profile 330 comprises an actuated VAFN panel profile 322. As shown by the actuated VAFN panel profile 332, if the VAFN panel 110 is actuated by an SMA actuator, the VAFN panel 110 is deflected/deployed outward into the free stream flow 120 (FIG. 2) and away from the fan flow 116 by an amount d2 as compared to the nominal VAFN panel profile 312. In this manner, according to this embodiment (i.e., a morphable fan nozzle with VAFN panel 110 and without the VGC 112), the deformable structures 202 can reduce the noise caused by the turbofan engine (FIG. 1) via the first mechanism as explained above.

The actuated profile 340 shows an exemplary actuated state of each of the deformable structures 202 comprising a constant area fan nozzle panel (CAFN panel) coupled to the VGC 112 at the attachment point 344. The actuated profile 340 comprises a nominal VAFN panel profile 312, and an actuated VGC profile 342. Since the CAFN panel is not actuated, it may not contribute to changing the shape of the deformable structures 202; therefore, the nominal VAFN panel profile 312 also represents the CAFN panel profile in the actuated profile 340. As shown by the actuated VGC profile 342, if the VGC 112 is actuated by an SMA actuator, the VGC 112 deploys into the fan flow 116 by an amount d1 compared the nominal VGC profile 314. In this manner, according to this embodiment (deformable structures each comprising a CAFN panel and a VGC) the deformable structures 202 reduce the noise caused by the turbofan engine (FIG. 1) via the second mechanism as explained above.

Figure 4:
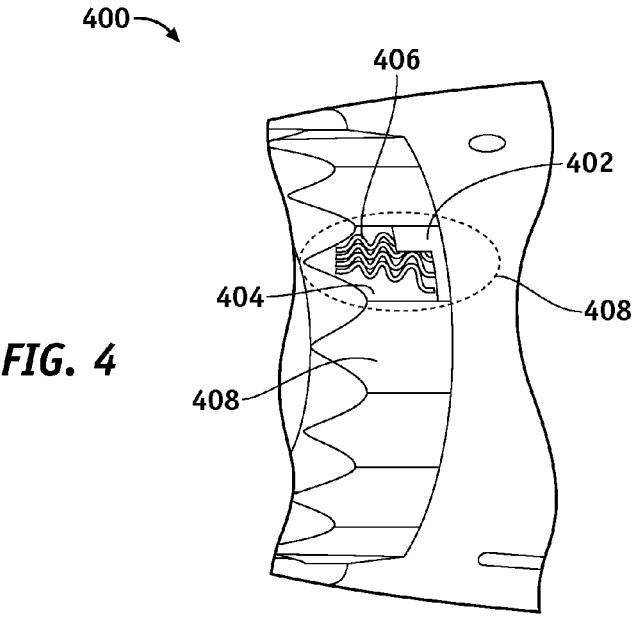
FIG. 4 illustrates a schematic view of a portion of the morphable fan nozzle of FIG. 1 showing an exemplary shape memory alloy (SMA) actuated aerostructure as an example of a deformable structure according to an embodiment of the disclosure.

FIG. 4 illustrates a schematic view 400 of a portion 124 of the morphable fan nozzle 106 of FIG. 1 showing an exemplary SMA actuated aerostructure 408 as an exemplary deformable structure according to an embodiment of the disclosure. The SMA actuated aerostructure 408 may comprise one or more substantially sinusoidal, or the like, SMA actuators 406.

A shape memory alloy (SMA) remembers its original shape after being deformed from that original shape. An SMA returns to its original shape when it is heated (shape memory effect) or when the deforming pressure is removed (super-elasticity). An SMA that returns to its original shape when heated is a one-way SMA. A two-way SMA remembers two different shapes: one shape at a relative low temperature, and another shape at a relative high temperature. Setting the two shapes by thermo-mechanical processing is known as "training" the SMA. An SMA with the two shapes set is known as a "trained" SMA. The shape properties of a trained SMA result from a temperature initiated martensitic phase transformation from a low symmetry (martensite) to a highly symmetric (austenite) crystal structure. The temperatures at which the SMA changes its structure depend on the particular alloy, and can be tuned by varying the chemical mix and thermo-mechanical processing. Some common SMA materials are copper-zinc-aluminum, copper-aluminum-nickel, nickel-titanium-platinum, nickel-titanium-palladium, nickel-titanium-hafnium and nickel-titanium (NiTi or Nitinol). NiTi SMA alloys generally have superior mechanical properties to copper-based SMAs, but are also generally more expensive. The SMA actuators according to various embodiments of the disclosure may be made, for example but without limitation, from any of these aforementioned SMA materials.

Existing movable chevrons may use a single SMA that is a solid, flat or tapered bar actuator made of SMA material that is connected to only one of the two face sheets that compose each of the chevrons. The existing designs do not take advantage of both face sheets. In this manner, existing designs do not allow three dimensional shape changes. Moreover, the existing designs use stiff structures to withstand the aero load. Therefore, large actuators are used to bend the structure, which increases the weight. Extra weight adversely affects the overall performance of an aircraft. The additional weight reduces aircraft range and can result in additional fuel consumption for operation of the engine. Therefore, in turbofan engine fabrication, weight increases should be avoided since the weight increase resulting from the addition of a variable area fan nozzle can negate benefits gained from improved fuel efficiency resulting from the reduced diameter of the variable area nozzle during cruise conditions.

As shown in FIG. 4 the sinusoidal SMA actuators 406 are located (i.e., sandwiched) between a first face sheet 402 and a second face sheet 404 of SMA actuated aerostructure 408 (deformable structure) according to an embodiment of the disclosure. In this manner, embodiments of the disclosure provide for a stiff aerostructure that also changes shape. As explained above, the SMA actuators 406 can be made from SMA material to allow the SMA actuated aerostructure 408/108 to morph in multiple dimensions such as three dimensions to form complex shape changes as explained in more detail below.

Figure 5:
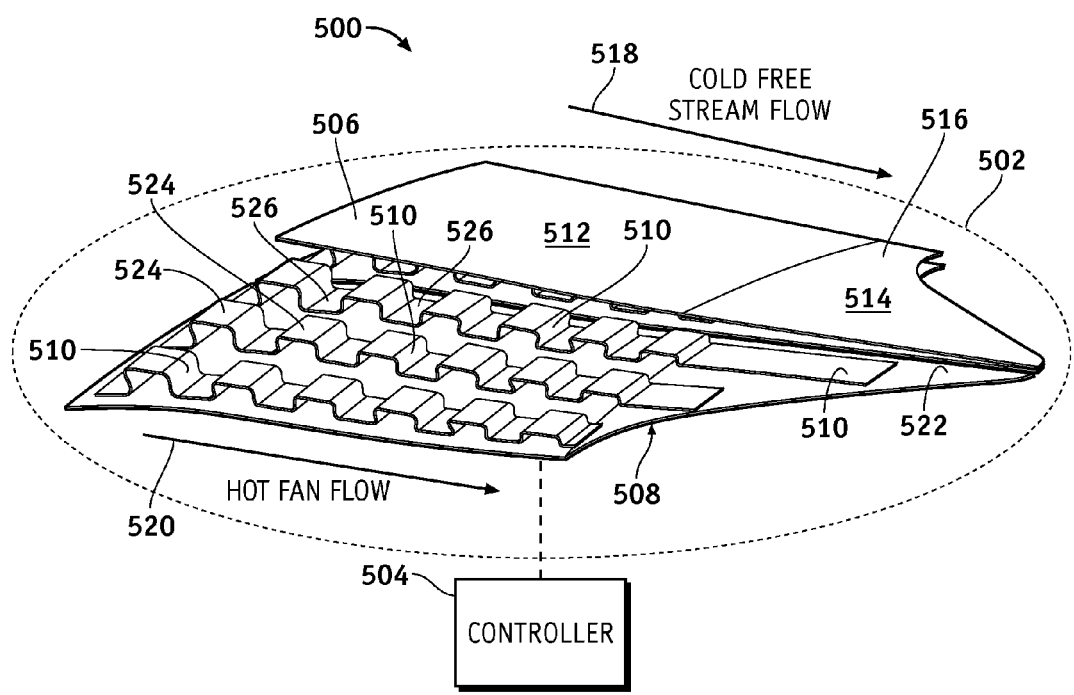
FIG. 5 illustrates a morphing system showing an enlarged schematic view of the exemplary SMA actuated aerostructure shown in FIG. 4 according to an embodiment of the disclosure.

FIG. 5 illustrates a morphing system 500 which shows an enlarged view of the SMA actuated aerostructure 408 shown in FIG. 4 according to an embodiment of the disclosure. The morphing system 500 may comprise an SMA actuated aerostructure 502 and a controller 504.

The SMA actuated aerostructure 502 may comprise an upper face sheet 506, a lower face sheet 508, and one or more SMA actuators 510 located therebetween. The SMA actuated aerostructure 502 may be coupled to, without limitation, the lip area 114 of the turbofan engine nacelle 100, the trailing edge of a thrust reverser sleeve (not shown), the core flow nozzle 104, or the like. In this embodiment the SMA actuated aerostructure 502 may comprise a VAFN panel 512 (110 in FIG. 1) and a VGC 514 (112 in FIG. 1) as explained above in the context of discussion of FIGS. 1-3. The VAFN panel 512 may be coupled to the VGC 514 via a VGC attachment 516. The SMA actuated aerostructure 502 may also be used on other aircraft structures, automotive structures, fluid flow systems, and the like.

In one embodiment, the upper face sheet 506 may be located in contact with or in proximity to a cold free stream flow 518 (free stream flow 120 in FIGS. 1-2) when, for example, used in an aircraft morphable fan nozzle application. Because the upper face sheet 506 needs to be deformable, materials used for the upper face sheet 506 may require an appropriate amount of flexibility. Also, since in this embodiment the upper face sheet 506 is in a relatively lower temperature environment, the upper face sheet 506 may require less temperature resistance than the lower face sheet 508. The upper face sheet 506 may comprise, without limitation, materials such as aluminum alloys, graphite composites, ceramic-metal composites, plastics, and the like.

The lower face sheet 508 may be located in contact with or in proximity to the hot fan flow 520 (fan flow 116 in FIGS. 1-2) when, for example, used in an aircraft morphable fan nozzle application. Because the lower face sheet 508 needs to be deformable, materials used for the lower face sheet 508 may require an appropriate amount of flexibility. Also, since in this embodiment the lower face sheet 508 is in a relatively higher temperature environment, the lower face sheet 508 may require a more temperature resistance material than the upper face sheet 506. The lower face sheet 508 may comprise materials such as, for example but without limitation, higher temperature resistant aluminum alloys, graphite composites, ceramic-metal composites, higher temperature resistant plastics, and the like.

The SMA actuators 510 may be coupled to, for example but without limitation, an inner surface (not shown) of the upper face sheet 506 and an inner surface 522 of the lower face sheet 508 at various connection points such as connection points 524 and 526 respectively. For example, the SMA actuators 510 may be connected to the inner surface (not shown) of the upper face sheet 506 at at least one of the connection points 524 and the inner surface 522 of the lower face sheet 508 at various connection points such as connection points 526 and vice versa. The connection points 524/526 may be located, for example but without limitation, at substantially maxima and minima of the SMA actuators 510 respectively. The SMA actuators 510 may be connected to the first and the second face sheets 506/508 of the SMA actuated aerostructure 502, for example but without limitation, by rivets, adhesives, fastening, welding, brazing, bonding, and the like. Because the SMA actuators 510 are connected to both face sheets 506/508 in multiple locations such as 524/526, structure of the SMA actuated aerostructure 502 remains stiff in various configurations. In this manner, the load applied by the SMA actuators 510 to the rest of the SMA actuated aerostructure 502 is distributed throughout the SMA actuated aerostructure 502. This allows for complex shape changes of the SMA actuated aerostructure 502.

In various embodiments, complex multi-dimensional shape changes such as three-dimensional shape changes of the SMA actuated aerostructure 502 are provided by activating shape changes of the SMA material. The SMA actuated aerostructure 502 may comprise multiple SMA actuators 510, which may be activated individually or in combinations and each in varying amounts of deformation. Furthermore, each of the SMA actuators 510 may have heating or cooling elements at various locations. For example, the SMA actuators 510 may be heated in multiple sections of one SMA strip, and/or multiple strips of the VGC 514 and/or VAFN panel 512 may each be individually heated and controlled. Thus, each of the SMA actuators 510 may be deformed to varying degrees at one or more points in a controlled manner, and thus the one or more SMA actuators 510 may be used in combination to form complex 3-dimensional shapes as explained in more detail below in the context of FIG. 14.

A controller 504, may be located remotely from the SMA actuated aerostructure 502, or may be coupled to the SMA actuated aerostructure 502. The SMA actuators 510 are controllable by adjusting a temperature between the martensite and austenite finish temperatures such that shapes in between the extreme actuated states can be selected and maintained using the controller 504. The controller 504 may be implemented as part of the aircraft system, a centralized aircraft processor, a subsystem computing module devoted to the deferrable structure arrangements explained above, or the like. In operation, the controller 504 may control the SMA actuated aerostructure 502 by monitoring the temperature of the SMA actuators 510 and by heating and/or cooling at least a portion of at least one of the SMA actuators as needed. The heating/cooling of the SMA actuators 510 may be provided by, for example but without limitation, the aircraft cooling/heating systems and the like. For example, a heater may utilize an electrical heater element and a controllable current source where the temperature is proportional to the current applied to the heater element. In this manner, the controller 504 determines a temperature based on a current flight condition, and provides heating/cooling to activate/deactivate the SMA actuators 510 as explained above. This enables the controller 504 to control the actuation of the SMA actuated aerostructure 502 in accordance with the current flight conditions, e.g., whether the aircraft is approaching, landing, taking off or in cruise. The controller 504 may be used to optimize characteristics of the SMA actuated aerostructure 502 for noise, lift, drag, and the like.

Figure 6:
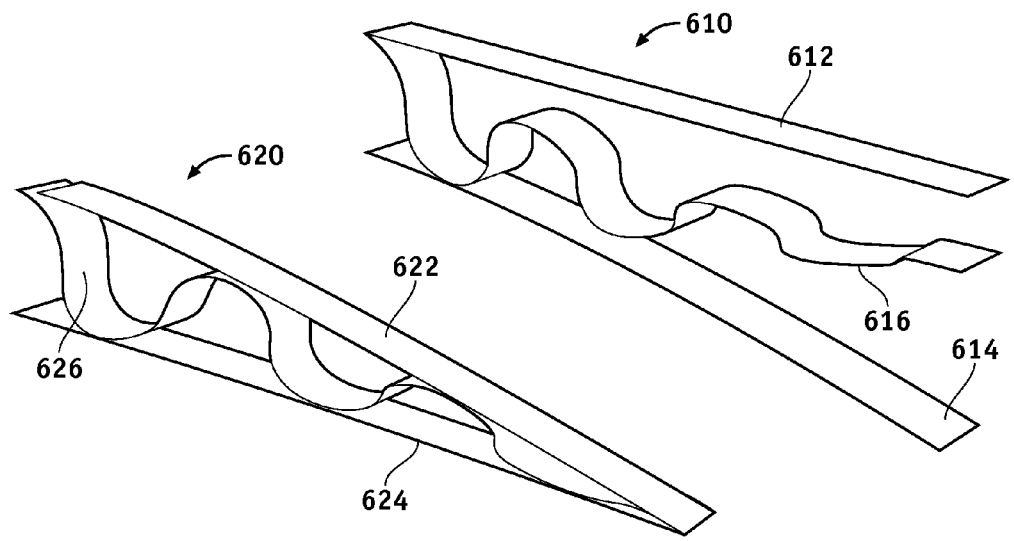
FIG. 6 illustrates schematic perspective views of an exemplary SMA actuated aerostructure prior-to-assembly and after-assembly according to an embodiment of the disclosure.

FIG. 6 illustrates schematic perspective views of an exemplary prior-to-assembly SMA actuated aerostructure 610 and an exemplary after-assembly (assembled) SMA actuated aerostructure 620. The prior-to-assembly SMA actuated aerostructure 610 comprises a top face sheet 612, a bottom face sheet 614, and a complex SMA actuator 616. As shown in FIG. 6, the prior-to-assembly SMA actuated aerostructure 610 is assembled into the assembled SMA actuated aerostructure 620 comprising a complex shape. The assembled SMA actuated aerostructure 620 comprises a top face sheet 622, a bottom face sheet 624 and an SMA actuator 626 according to an embodiment of the disclosure.

Figure 7:
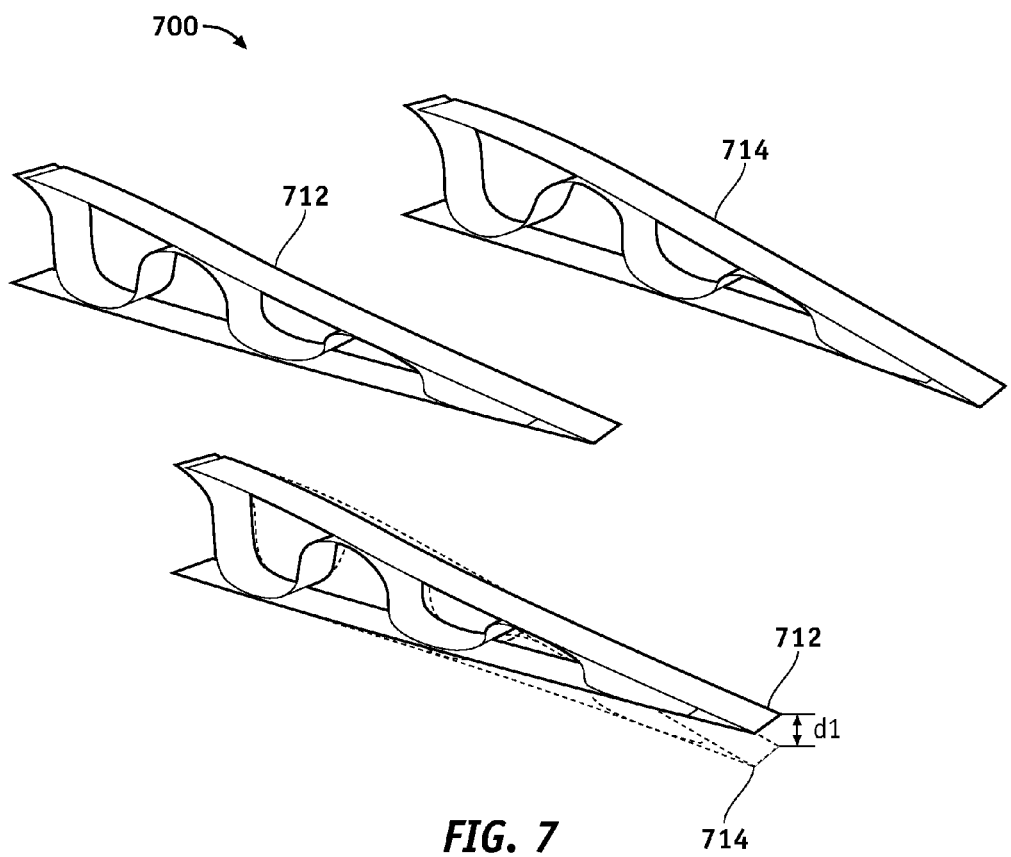
FIG. 7 illustrates a schematic perspective view of an exemplary assembled SMA actuated aerostructure at a first actuated state, a second actuated state, and an overlay of the first and second actuated states.

FIG. 7 shows an exemplary SMA actuated aerostructure 700 at a first actuated state (first position) 712 (e.g., hot), at a second actuated state (second position) 714 (e.g., cold), and an overlay of the first actuated state 712 and the second actuated state 714 showing a deployed position d1 as explained above.

Prior to assembly (i.e., prior-to-assembly SMA actuated aerostructure 610), the top face sheet 612, the bottom face sheet 614, and the SMA actuator 616 may each have their own respective shape, and after assembly tension from their respective shapes can balance to form a high stiffness structure such as the assembled SMA actuated aerostructure 620.

Embodiments of the disclosure can be used in either a one-way or a two-way shape memory effect. In a case of one-way shape memory effect, the assembled SMA actuated aerostructure 620 itself provides the force that deforms the SMA material when cooling. Upon heating, the shape memory effect can bring the assembled SMA actuated aerostructure 620 back to its starting point.

A pre-forming of the face sheets 612/614 may be used with a one-way SMA actuator to give the prior-to-assembly SMA actuated aerostructure 610 a first position 714 (cold position 714) when cold and a second position 712 (hot position 712) when hot. When an SMA actuator is in its cold state, the SMA material (i.e., metal) can be bent or stretched into a variety of new shapes and can hold that shape until it is heated above the transition temperature. Upon heating, the shape changes back to its original shape, regardless of the shape it was morphed to when cold. When the metal cools again it can remain in the original shape, until deformed again (e.g., by tension of the face sheets 622/624). Thus, the SMA actuator 616 is given an original shape prior-to-assembly, and the assembled SMA actuated aerostructure 620 has a cold position 714. When the SMA actuator 626 is heated, the assembled SMA actuated aerostructure 620 is repositioned by the SMA actuator 626 to hot position 712, and when the SMA actuator 626 is cooled, the tension of the face sheets 622/624 return the assembled SMA actuated aerostructure 620 to cold position 714.

For a two-way SMA actuator, the SMA remembers two different shapes: one at low temperatures, and one at high temperatures. The two different shapes can be obtained without the application of an external force from the face sheets 622/624. The assembled SMA actuated aerostructure 620 has a cold position 714 with the SMA actuator 626. When the SMA actuator 626 is heated, the assembled SMA actuated aerostructure 620 is repositioned by the SMA actuator 626 to hot position 712, and when the SMA actuator 626 is cooled, the SMA actuator 626 returns the SMA actuated aerostructure 620 to the cold position 714.

As explained above, the temperature change may be allowed to occur passively from, for example but without limitation, the heating from the engine, ambient air or be made actively by heating and cooling devices attached to the SMA actuator 626 and controlled by the controller 504. Different parts of the SMA actuator 626 may be heated or cooled separately. For example, each section of the SMA actuator 626 located between its connection points (e.g., 524/526 in FIG. 5) may be heated separately. Controlling a temperature at each section of the actuator allows control of a shape of each section, and control of an angle and a degree of curvature of the SMA actuator 626 as explained in more detail below in the context of FIG. 14.

Figure 8:
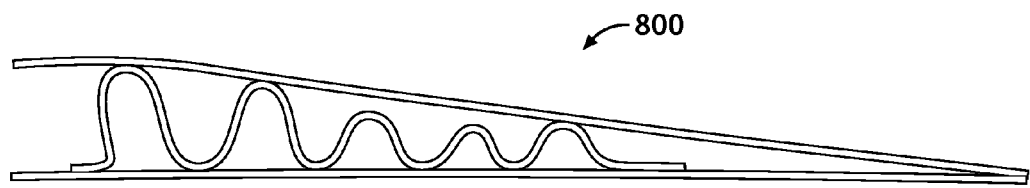
FIG. 8 illustrates a side view of an exemplary assembled SMA actuated aerostructure according to an embodiment of the disclosure.

FIG. 8 illustrates a side view of an exemplary assembled SMA actuated aerostructure 800 at a nominal state (non-actuated state) incorporating fasteners to attach the SMA actuators 810 to its face sheets. As explained above, various methods may be used to attach the shape memory alloy actuators 810 to face sheets of the SMA actuated aerostructure 800, for example but without limitation, braising, welding, glue, fasteners, rivets, and the like.

Figure 9:
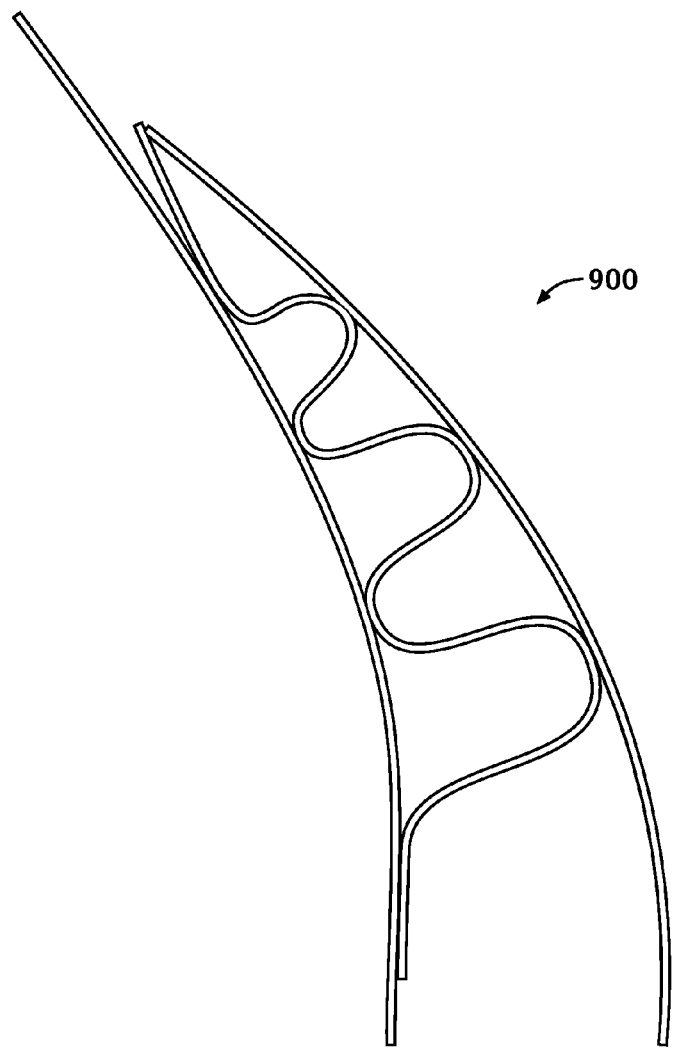
FIG. 9 illustrates a side view of the exemplary assembled SMA actuated aerostructure of FIG. 8 in an actuated state.

FIG. 9 illustrates a side view of an exemplary assembled SMA actuated aerostructure 900 at an actuated state (shown in FIG. 8 at a non-actuated state). The assembled SMA actuated aerostructure 900 can be used to provide a high stiffness deformable structure for various applications such as changing the area of the morphable fan nozzle 106 at various flight conditions.

Figure 10:
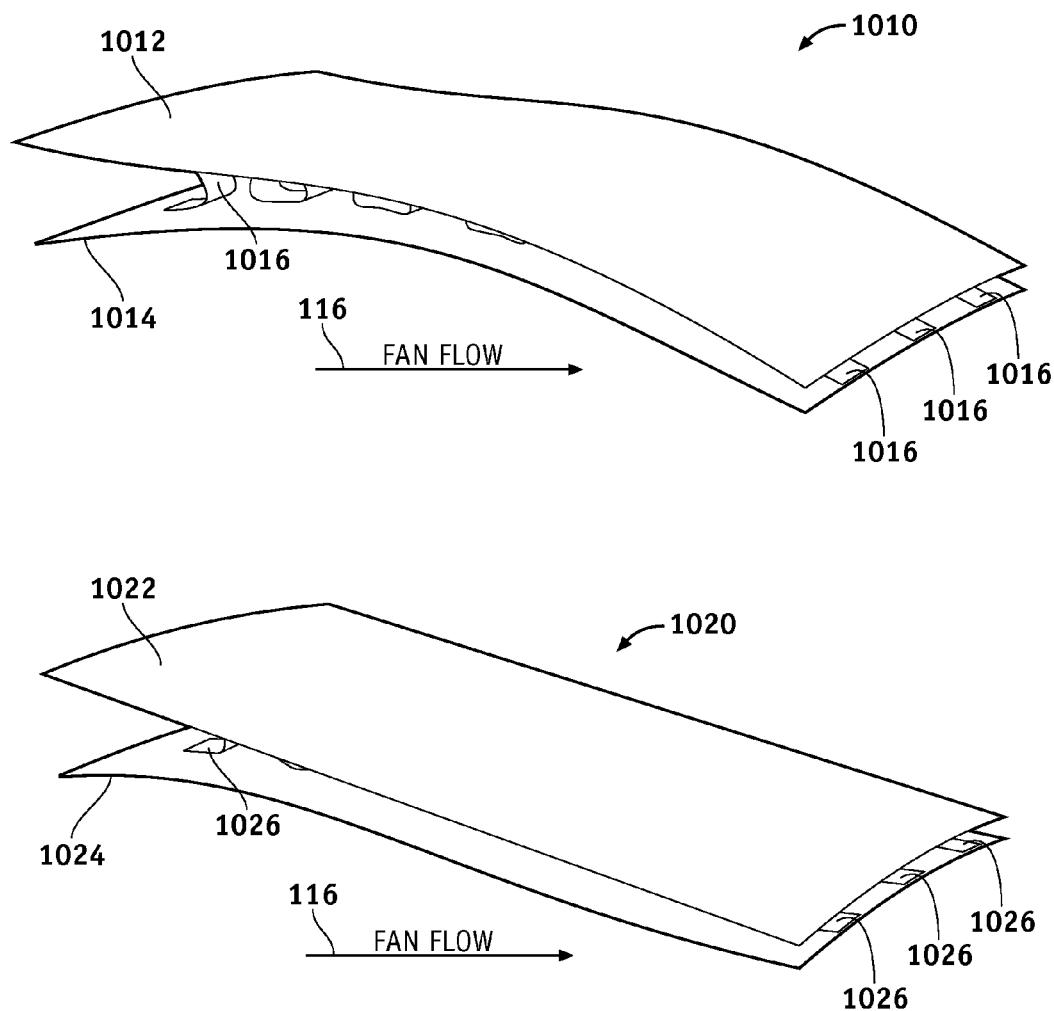
FIG. 10 illustrates perspective views of an exemplary SMA actuated aerostructure that can be used to form a VAFN panel according to an embodiment of the disclosure.

FIG. 10 illustrates perspective views of an exemplary SMA actuated aerostructure at a first actuated state 1010 and a second actuated state 1020. The SMA actuated aerostructures can be used to form the VAFN panel 110 as explained above. The SMA actuated aerostructure at the first actuate state 1010 comprises a first face sheet 1012, a second face sheet 1014, and one or more actuators 1016 therebetween. The SMA actuated aerostructures at the second actuated state 1020 comprises a first face sheet 1022, a second face sheet 1024, and one or more actuators 1026 therebetween. The SMA actuated aerostructures can be actuated via the SMA actuators 1016/1026 to change its shape form its first actuated state 1010 to its second actuated state 1020 in response to a temperature change as explained below in the context of discussion of FIGS. 13-14.

Figure 11:
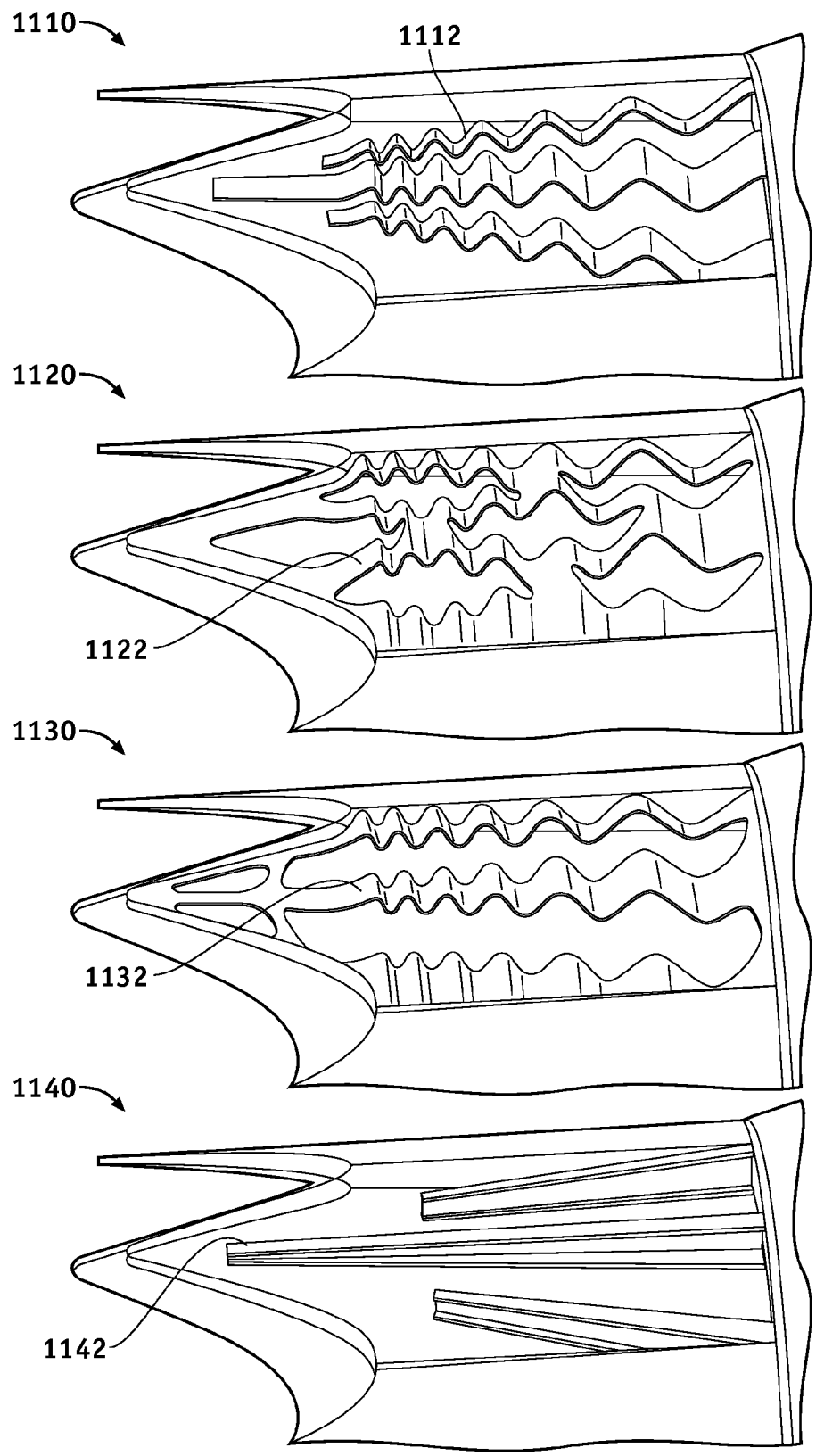
FIG. 11 illustrates perspective top views of exemplary SMA actuated aerostructures utilizing "strips", "lattice", "connected strips", and "I-beam" SMA actuators respectively according to various embodiments of the disclosure.

FIG. 11 illustrate perspective top views of exemplary SMA actuated aerostructures 1110, 1120, 1130, and 1140 utilizing "strips" 1112, "lattice" 1122, "connected strips" 1132, and "I-beam" 1142 SMA actuators respectively according to various embodiments of the disclosure.

Figure 12:
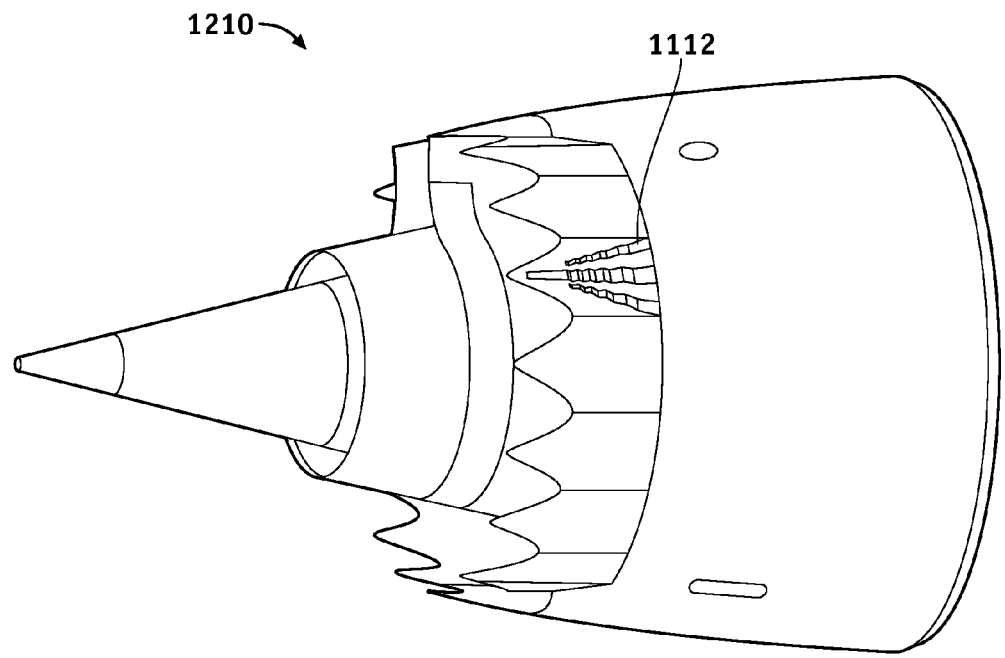
FIG. 12 illustrates schematic views of two morphable fan nozzles showing two exemplary SMA actuated aerostructures incorporating the "Strips" SMA actuator and the "Lattice" SMA actuator of FIG. 11 respectively according to two embodiments of the disclosure.
Figure 12:
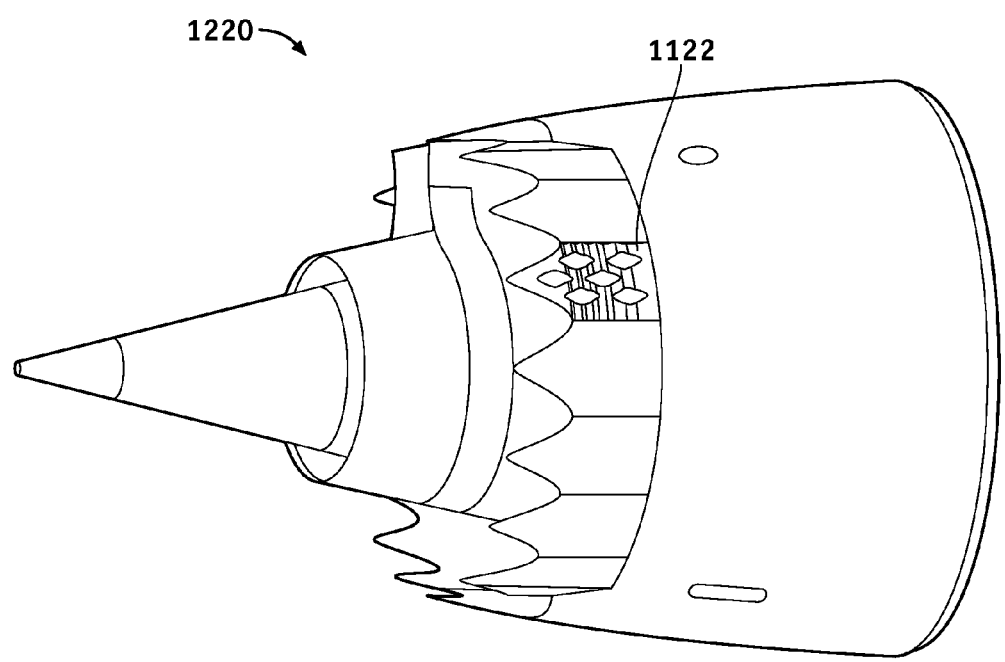

The particular topological features of the examples shown in FIG. 11 are among a number of possible embodiments of the disclosure and other topological features may also be used. Each of the SMA actuators 1112, 1122, 1132, and 1142 can be used, for example, in the morphable fan nozzle 106/200 for providing a high stiffness when secured between the two face sheets (506/508 FIG. 5) of each of the deformable structures 108 on the trailing edge lip area 114/208 of the morphable fan nozzle 106. For example, FIG. 12 illustrate schematic views of two morphable fan nozzles 1210 and 1220 showing exemplary SMA actuated aerostructures incorporating the "Strips" 1112 SMA actuator and the "Lattice" 1122 SMA actuator of FIG. 11 respectively.

Various shapes can be used for the SMA actuators 1112, 1122, 1132, and 1142 to optimize a design for weight, temperature resistance, stiffness, and the like.

Noise reduction is most needed for takeoff of an aircraft and to a lesser degree during cruise. Thus, any noise reduction system/device that reduces noise at takeoff (i.e., a high thrust condition) ideally should not significantly degrade the fuel burn during cruise. A compromise therefore exists between the design of the SMA actuated aerostructures (deformable structures) for noise abatement and the need for low cost operation during cruise and other flight segments.

Figure 13:
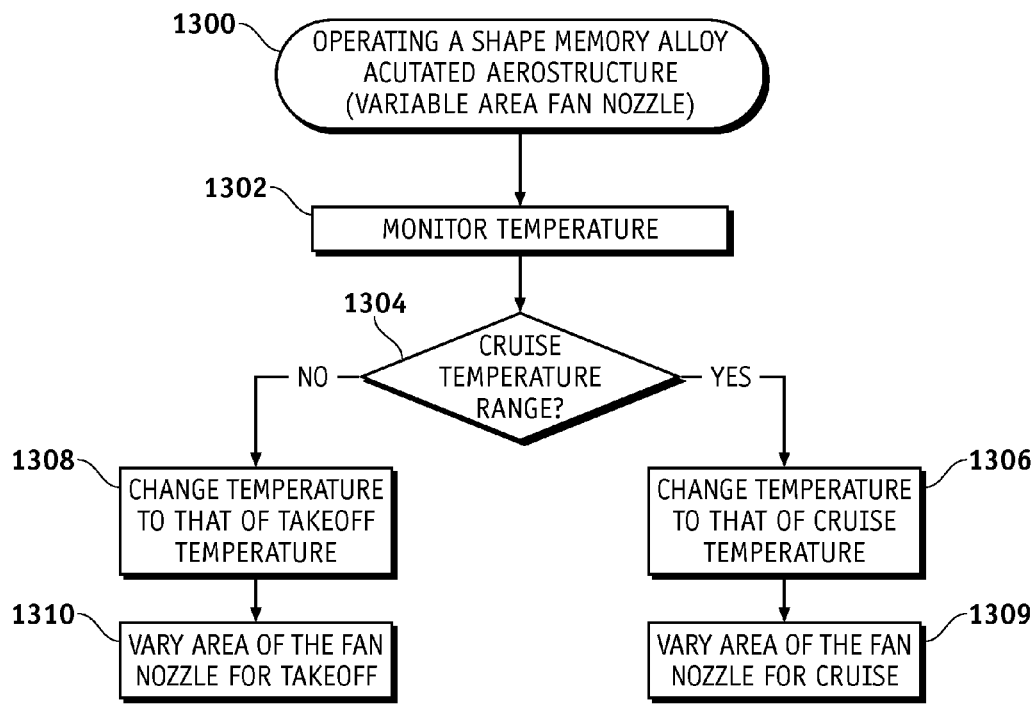
FIG. 13 is a flow chart showing an exemplary process for operating an SMA actuated aerostructure according to an embodiment of the disclosure.

FIG. 13 illustrates an exemplary flow chart showing a process 1300 for operating an SMA actuated aerostructure according to an embodiment of the disclosure. Process 1300, provides for controlling temperature of SMA actuator to optimize characteristic of the SMA actuated aerostructure. The various tasks performed in connection with process 1300 may be performed by software, hardware, firmware, or any combination thereof. For illustrative purposes, the following description of process 1300 may refer to elements mentioned above in connection with FIGS. 1-12. In practical embodiments, portions of process 1300 may be performed by different elements of the morphing system 500 for reducing airflow noise, e.g., the SMA actuated aerostructures, the SMA actuators, and the controller. Process 1300 is described in terms of one of the example embodiments described herein, namely, SMA actuators to morph (e.g., deploy, change shape, retract) the SMA actuated aerostructures.

Process 1300 for operating a SMA actuated aerostructure may begin by monitoring a temperature (task 1302). Process 1300 modifies the temperature actively by a controller connected to the aircraft systems as described in the context of FIG. 5 above, or alternatively may use the ambient temperature, the engine temperature and the like to passively change the temperature of the SMA actuators at various flight conditions. In practice, the SMA actuators remember their original shape after being deformed from that original shape. In this manner, the SMA actuators return to an original shape when heated or when a deforming pressure is removed. As mentioned above, a two-way SMA remembers two different shapes: one shape at a relative low temperature, and another shape at a relative high temperature. Setting the two shapes can be accomplished by thermal-mechanically "training" the SMA. In this manner, for example, the SMA actuators can be trained to remember various positions corresponding to various shapes of the deformable structure suitable for reducing noise and associated drag for a range of flight conditions such as cruise and landing. These properties result from temperature initiated martensitic phase transformation from a low symmetry (martensite) to a highly symmetric (austenite) crystal structure.

As mentioned above, in various embodiments, the SMA actuators are, without limitation, formed from a material in the family of titanium-nickel alloys that have shape memory and superelastic properties. In this manner, if the flight condition corresponds to the cruise temperature range (inquiry task 1304), then the temperature of the trained SMA actuators are changed to that of the cruise condition (task 1306). For example, the trained SMA actuators may be thermally deactivated to return to a martensite shape. Then the deformable structure suitably deforms (task 1309) for the cruise flight conditions. For a cruise condition, for example, the temperature may be about −40° C. In this manner, each of the SMA actuated aerostructures (i.e., each of the deformable structures such as a VAFN panel) can deform from a first position away from the flow path of the fan flow to a second position adjacent (or in proximity) to the flow path to minimize thrust specific fuel consumption (TSFC) to improved fuel efficiency. For example, without limitation, thermally deactivating the SMA actuator to return to its martensite shape allows the area of the morphable fan nozzle to decrease for the cruise flight conditions.

Otherwise, process 1300 changes the temperature of the trained SMA actuators to the temperature corresponding to the takeoff, flight conditions (task 1308), and thermally activates the SMA actuators. In this manner, each of the SMA actuated aerostructures such as the VAFN panel is deformed (deflected/deployed) from a first position adjacent (or in proximity) to the flow path to a second position extending outward into the free stream flow (pulled back out of the fan flow). As explained above, the increase in the area of the morphable fan nozzle causes a decrease in velocity of fan flow that is moving through the morphable fan nozzle, thereby making the engine quieter.

In one embodiment, the controller is configured to change temperature of the SMA actuators non-uniformly. The controller may vary temperatures of respective segments of each of the at least one SMA actuators separately from each other, wherein each of the temperatures are different from one another. In this manner, different regions of a 3-dimensional SMA actuator can be heated to different temperatures via the controller to effect different levels of deformation in different regions of the structure. For example as mentioned above, different actuators can be heated by different amounts to maintain a desired shape.

In various embodiments, complex 3-dimensional shape changes of the SMA actuated aerostructure are provided by activating shape changes of the SMA material. There may be multiple SMA actuators in the SMA actuated aerostructure, which may be activated individually or in combinations and each in varying amounts of deformation. Furthermore, each of the SMA actuators may have heating or cooling elements at various locations. For example, the SMA actuators may be heated in multiple sections of one SMA strip, and/or multiple strips per SMA actuated aerostructure may each be individually heated and controlled. Thus, each of the SMA actuators may be deformed to varying degrees at one or more points in a controlled manner, and thus the one or more SMA actuators may be used in combination to form complex 3-dimensional shapes.

Figure 14:
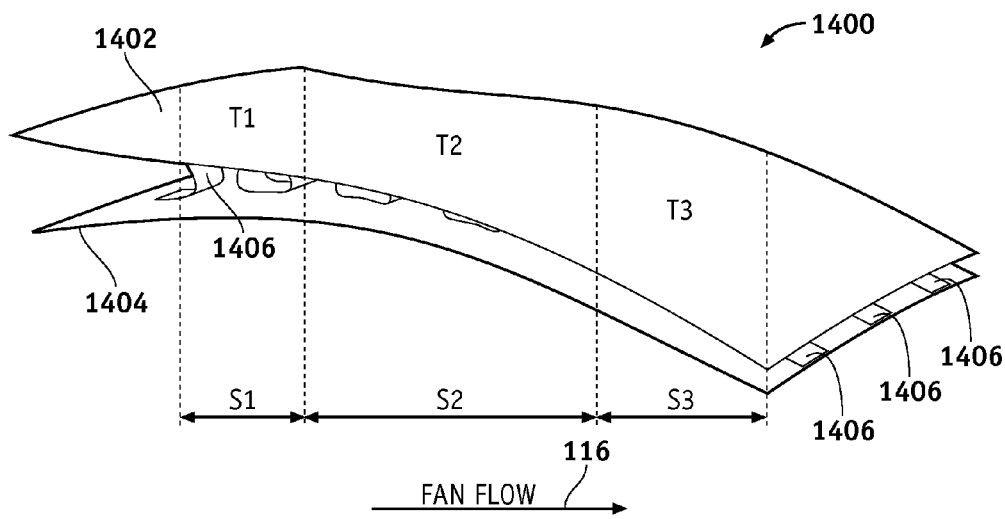
FIG. 14 illustrates an SMA actuated aerostructure showing 3-dimensional shape changes of a VAFN panel in response to temperature changes at one or more segments of one or more SMA actuators according to an embodiment of the disclosure.

FIG. 14 illustrates an SMA actuated aerostructure 1400 showing 3-dimensional (3-D) shape changes of the VAFN panel in response to temperatures changes at various segments of one or more SMA actuators according to an embodiment of the disclosure. The embodiment shown in FIG. 14 may share similar features and functionalities to the morphing system 500. Common features, functions, and elements will not be redundantly described here. The SMA actuated aerostructure 1400 comprises a top face sheet 1402, a bottom face sheet 1404, and SMA actuators 1406 located therebetween. The SMA actuators 1406 can be heated at various sections S1-S3 to various temperatures T1-T3 respectively to morph to various actuated states (1010 and 1020 in FIG. 10). In this manner, the SMA actuators 1406 can morph the SMA actuated aerostructure 1400 into various shapes comprising various angles and degree of curvature to obtain suitable profiles to alter the fan flow 116 as described above in the context of discussion of FIG. 3. Absolute temperatures required to effect actuation of the SMA actuators depends on the particular heat treatment used to produce the SMA actuators and may be selected based on an intended application. For example but without limitation, the temperatures T1-T3 may be about 20° C. to 80° C., or given a different heat treatment T1-T3 might be 50° C. to 120° C.

Morphable aerostructures can result in reduced weight and more accurate shape changes of an aerosurface because of the improvement over the existing solutions. Morphing aerosurfaces have the potential to reduce drag, increase lift, reduce noise, and improve fuel efficiency. A light weight morphing structure which can undergo complex shape changes permits a morphable fan nozzle of a turbofan engine to change area at various flight conditions, but can also be stiff enough to resist loading such as pressure from air flow through the fan nozzle.

With the high stiffness shape memory alloy actuated aerostructure according to various embodiments of the disclosure, area of a fan nozzle of a turbofan engine can vary to reduce the noise from the turbofan engine during a takeoff while fuel burn during cruise is not degraded.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional", "traditional", "normal", "standard", "known", and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more", "at least", "but not limited to", or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1, 2, 4-12, and 14 depict example arrangements of elements, additional intervening elements, devices, features, or components may be present in an embodiment of the disclosure.

What is claimed is:

1. A shape memory alloy actuated aerostructure comprising:
   a first face sheet;
   a second face sheet; and
   at least one shape memory alloy actuator comprising one layer of shape memory alloy metal coupled to the first face sheet at at least one first location on the first face sheet and coupled to the second face sheet at a plurality of second locations on the second face sheet and operable to obtain an optimum area for a variable area fan nozzle by morphing the shape memory alloy actuated aerostructure thereby reducing noise, the at least one first location and the second locations located at substantially maxima and minima of the at least one shape memory alloy actuator respectively.

2. The shape memory alloy actuated aerostructure of claim 1, wherein the at least one shape memory alloy actuator is operable to deform the shape memory alloy actuated aerostructure in at least two dimensions.

3. The shape memory alloy actuated aerostructure of claim 1, wherein a shape of the at least one shape memory alloy actuator comprises at least one of the group consisting of: essentially sinusoidal, a lattice, an I-beam, strips, and connected strips.

4. The shape memory alloy actuated aerostructure of claim 1, wherein the shape memory alloy actuated aerostructure comprises at least one of the group consisting of: a variable area fan nozzle panel, and a variable geometry chevron.

5. The shape memory alloy actuated aerostructure of claim 1, wherein the shape memory alloy actuated aerostructure is coupled to at least one of the group consisting of: a fan nozzle, and a core nozzle.

6. The shape memory alloy actuated aerostructure of claim 1, wherein the shape memory alloy actuated aerostructure is coupled to at least one part of a thrust reverser sleeve.

7. The shape memory alloy actuated aerostructure of claim 1, wherein the at least one shape memory alloy actuator is passively controlled by temperature.

8. The shape memory alloy actuated aerostructure of claim 1, wherein the at least one shape memory alloy actuator is coupled to the first face sheet and the second face sheet by a method comprising at least on one of the group consisting of: adhering, brazing, welding, fastening, and bonding.

9. The shape memory alloy actuated aerostructure of claim 1, wherein a shape of the at least one shape memory alloy actuator comprises a lattice.

10. The shape memory alloy actuated aerostructure of claim 1, wherein a shape of the at least one shape memory alloy actuator comprises an I-beam.

11. The shape memory alloy actuated aerostructure of claim 1, wherein:
the at least one shape memory alloy actuator comprises a sinusoidal strip of shape memory alloy metal; and
the at least one first location and the second locations are located at substantially maxima and minima of the sinusoidal strip respectively.

12. A system for morphing an aerostructure, the system comprising:
at least one shape memory alloy actuated aerostructure comprising:
a first face sheet;
a second face sheet; and
at least one shape memory alloy actuator comprising one layer of shape memory alloy metal coupled to the first face sheet at at least one location on the first face sheet and coupled to the second face sheet at a plurality of locations on the second face sheet and operable to obtain an optimum area for a variable area fan nozzle by morphing the shape memory alloy actuated aerostructure thereby reducing noise, the first location and the second locations located at substantially maxima and minima of the at least one shape memory alloy actuator respectively; and
a controller operable to activate at least one region of the at least one shape memory alloy actuator to morph the at least one shape memory alloy actuated aerostructure.

13. The system of claim 12, wherein the at least one shape memory alloy actuated aerostructure extends from a lip area of the nozzle in proximity to a flow path of a gas flow emitted from the nozzle.

14. The system of claim 13, wherein the at least one shape memory alloy actuated aerostructure is deformable between a first position in proximity to the flow path to a second position extending into the flow path.

15. The system of claim 13, wherein the at least one shape memory alloy actuated aerostructure is deformable from a first position in proximity to the flow path to a second position extending away from the flow path.

16. The system of claim 13, further comprising shaping the at least one shape memory alloy actuator in response to a temperature change to obtain an optimum area for the nozzle by morphing the shape memory alloy actuated aerostructure based on at least one flight condition.

17. The system of claim 12, wherein a shape of the at least one shape memory alloy actuator comprises a lattice.

18. The system of claim 12, wherein a shape of the at least one shape memory alloy actuator comprises an I-beam.

19. The system of claim 12, wherein:
the at least one shape memory alloy actuator comprises a sinusoidal strip of shape memory alloy metal; and
the at least one first location and the second locations are located at substantially maxima and minima of the sinusoidal strip respectively.

* * * * *